United States Patent
Chung

(10) Patent No.: US 7,434,937 B2
(45) Date of Patent: Oct. 14, 2008

(54) METHODS AND SYSTEMS FOR CALIBRATING REAR PROJECTION VIDEO

(75) Inventor: Yau Wing Chung, Fremont, CA (US)

(73) Assignee: Optoma Technology, Inc., Milpitas, CA (US)

( * ) Notice: Subject to any disclaimer, the term of this patent is extended or adjusted under 35 U.S.C. 154(b) by 350 days.

(21) Appl. No.: 11/272,645

(22) Filed: Nov. 15, 2005

(65) Prior Publication Data

US 2007/0024820 A1  Feb. 1, 2007

Related U.S. Application Data

(60) Provisional application No. 60/703,433, filed on Jul. 29, 2005.

(51) Int. Cl.
 *G03B 21/14* (2006.01)
(52) U.S. Cl. .................. 353/70; 353/74; 359/460; 348/745
(58) Field of Classification Search .............. 353/119, 353/69, 70, 74; 348/745–747, 785, 786–788, 348/794, 806; 359/460, 456
See application file for complete search history.

(56) References Cited

U.S. PATENT DOCUMENTS

| | | | |
|---|---|---|---|
| 5,146,331 A | 9/1992 | Tsuchida | |
| 5,264,929 A | 11/1993 | Yamaguchi | |
| 5,323,235 A | 6/1994 | Tonomura | |
| 5,481,299 A | 1/1996 | Coffey et al. | |
| 5,572,263 A | 11/1996 | Kim et al. | |
| 5,795,046 A | 8/1998 | Woo | |
| 5,890,787 A * | 4/1999 | McNelley et al. | 353/28 |
| 5,949,494 A | 9/1999 | Yamagata | |
| 6,122,018 A | 9/2000 | Sugihara et al. | |
| 6,154,256 A | 11/2000 | Bruins | |
| 6,473,135 B1 | 10/2002 | Iwamura | |
| 6,511,185 B1 | 1/2003 | Gananathan | |
| 6,591,314 B1 | 7/2003 | Colbath | |
| 6,690,425 B1 | 2/2004 | Worrell | |
| 6,755,540 B1 | 6/2004 | Runco | |
| 6,783,247 B2 * | 8/2004 | White | 353/79 |
| 6,830,341 B2 | 12/2004 | Ejiri | |
| 6,857,750 B2 | 2/2005 | Shimizu | |
| 6,932,479 B2 | 8/2005 | Kobayashi | |
| 6,932,480 B2 | 8/2005 | Wada | |
| 6,935,751 B2 | 8/2005 | Rieche | |
| 7,134,756 B2 * | 11/2006 | Drucker et al. | 353/77 |
| 2002/0021418 A1 * | 2/2002 | Raskar | 353/69 |
| 2005/0117075 A1 * | 6/2005 | De Vaan et al. | 348/787 |
| 2005/0168706 A1 * | 8/2005 | Sakai | 353/69 |

OTHER PUBLICATIONS

Dustin Sorenson, Current Video Projector Technologies, Dell White Paper, Jun. 2002, pp. 1-9.

* cited by examiner

*Primary Examiner*—Andrew T Sever
(74) *Attorney, Agent, or Firm*—MH2 Technology Law Group LLP

(57) ABSTRACT

A video system includes a video projector located in a housing a display screen disposed adjacent to the housing, wherein the display screen is capable of being tilted to expose the video projector, logic for generating a test image to display on the tilted display screen in order to calibrate the video projector, logic for projecting the test image onto the tilted display screen; and logic for calibrating the video projector using the test image. The test image is altered to fit the tilted display screen.

20 Claims, 12 Drawing Sheets

METHODS AND SYSTEMS FOR CALIBRATING REAR PROJECTION VIDEO

CROSS-REFERENCE TO RELATED APPLICATIONS

This application claims priority to U.S. Provisional Patent Application Ser. No. 60/703,433 filed on Jul. 29, 2005, the disclosure of which is incorporated in its entirety by reference herein.

FIELD

Aspects of the present invention generally relate to video display methods and systems.

BACKGROUND

Currently, in rear projection video systems in order to calibrate the projector of these systems, a user must open up an access panel in the system. Typically, the access panel is the display screen itself. The user must tilt the screen upwards to gain access to the video projector. The user must reach in the opening for the display screen and calibrate the projector. However, since display screen is tilted, the user cannot properly view the image from the projector in order to calibrate the projector. Further, the user must tilt the display screen back into its original position to view video and to determine if the calibration is successful.

Accordingly, the user cannot make adjustments to the video projector and simultaneous view the adjustments. Thus, the user must make adjustments to the projector and then step back from the video system, tilt the display screen back to its normal position, and view the adjustments. Since the user may not correctly calibrate the projector on the first try, the user may need to repeat these steps multiple times.

Other video system may place an access panel in the rear of video system. In video systems with this access panel, the video system must incorporate enough room for the user to get completely behind the system. Further, the user still cannot calibrate the video system without stepping out from behind the video system to view the calibration changes.

In other video systems, the access panel may be a large opening beneath the display screen. In video systems with this access panel, extra space must be incorporated into the video system below the display screen to accommodate the large access panel. Usually a central audio speaker is located beneath the screen and may interfere with this access panel. Further, the user still cannot calibrate the video system without stepping away from the video system to view the calibration changes.

SUMMARY

Aspects of the present invention concern a method for calibrating a video display system. The method includes tilting a display screen of the video display system to expose a video projector, generating a test image to display on the tilted display screen in order to calibrate the video projector, projecting the test image onto the tilted display screen, and calibrating the video projector using the test image. In the method, the test image is altered to fit the tilted display screen.

Additionally, aspects of the present invention concern a video system. The video system includes a video projector located in a housing a display screen disposed adjacent to the housing, wherein the display screen is capable of being tilted to expose the video projector, logic for generating a test image to display on the tilted display screen in order to calibrate the video projector, logic for projecting the test image onto the tilted display screen; and logic for calibrating the video projector using the test image. The test image is altered to fit the tilted display screen.

Additional aspects of the present invention will be set forth in part in the description which follows, and in part will be obvious from the description, or may be learned by practice of the invention. The aspects of the present invention will be realized and attained by means of the elements and combinations particularly pointed out in the appended claims.

Further, it is to be understood that both the foregoing general description and the following detailed description are exemplary and explanatory only and are not restrictive of the present invention, as claimed.

BRIEF DESCRIPTION OF THE DRAWINGS

The accompanying drawings, which are incorporated in and constitute a part of this specification, illustrate several aspects of the present invention and together with the description, serve to explain the principles of the invention.

DETAILED DESCRIPTION

Aspects of the present invention relate to systems and methods which improve the operation of a video projection system. A video projection system includes a display screen that is capable of being titled upward. As such, a user can tilt the display screen upward and gain access to the video projector inside the system in order to calibrate the video projector. Further, the video projector is capable of altering a test image so that the test image may be properly viewed on the tilted display screen. Thus, a user can calibrate the video projection while looking at the altered test image on the titled display screen.

Accordingly, the user can calibrate the video projector easily without having to step back from the video system. Further, the user does not have to open and close the display screen multiple times in order to calibrate the video projector. Also, the video system may be compact since an additional access panel does not have to be included in the video system.

Reference will now be made in detail to various aspects of the present invention, examples of which are illustrated in the accompanying drawings. Wherever possible, the same reference numbers will be used throughout the drawings to refer to the same or like parts.

Figure 1A:
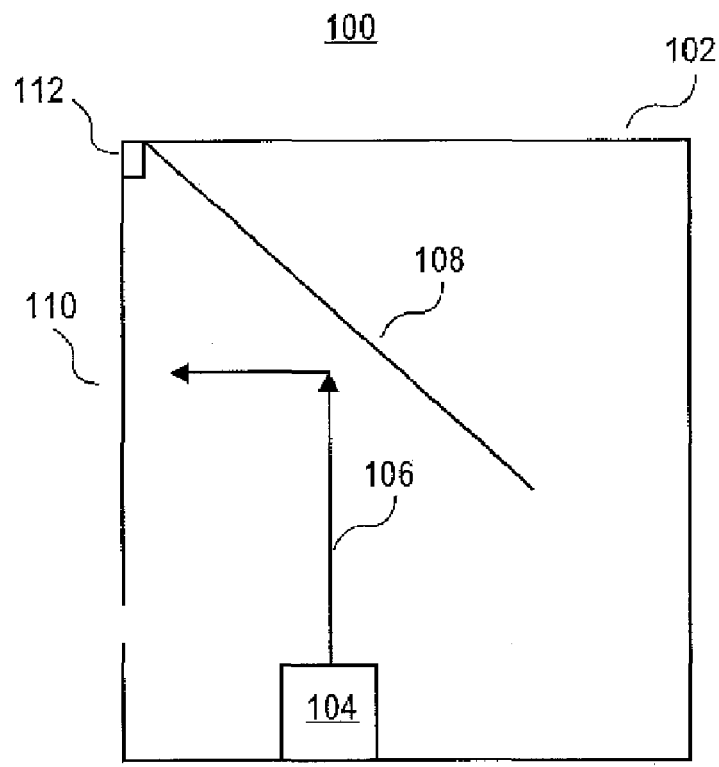
FIGS. 1a and 1b are diagrams illustrating a system for displaying a video consistent with aspects of the present invention.

FIG. 1a illustrates a video system 100 for displaying video consistent with aspects of the present invention. System 100 includes a housing 102, a video projector 104, a mirror 108, and a display screen 110. Housing 102 may be a separate portable housing capable of being moved such as a television set. Additionally, housing 102 may be integrated into another structure such as a wall.

Video projector 104 produces video 106 to be displayed on display screen 110. Video 106 projected onto display screen 102 may be moving video or still images. Video projector 104 may be any type of video projector capable of receiving a video signal and converting the video signal to a viewable image to be displayed on display screen 102. For example, video projector 104 may be a digital light processing ("DLP") video projector, a liquid crystal ("LCD") video projector, or cathode-ray tube ("CRT") projector.

As illustrated in FIG. 1A, video projector 104 produces video 106 and projects video 106 onto mirror 108. Mirror 108 reflects video 106 onto projection screen 110. Video projector 104 produces video 106 based on a signal from a video source (not shown). The video source may be any standard video equipment capable of generating a video signal readable by video projector 104. For example, the video source may be a Digital Versatile Disk ("DVD") player, laser disk player, Compact Disk ("CD") player, Video CD ("VCD") player, VHS player/recorder, Digital Video Recorder ("DVR"), video camera, video still camera, cable receiver box, or satellite receiver box. The video source may also be a standard laptop or desktop computer. One skilled in the art will realize that the preceding list of standard video equipment is exemplary and the video source may be any device capable of generating a video signal readable by video projector 104. Furthermore, the video source may be integrated with video projector 104. Additionally, video projector 104 may be coupled to multiple video sources.

Display screen 110 may be any type of display screen capable of displaying video from a projector located behind display screen 110. For example, display screen may be glass, glass coated with a diffusion material, glass embedded with a diffusion material, acrylic substrate, acrylic substrate coated with a diffusion material, or acrylic substrate embedded with a diffusion material. One skilled in the art will realize that the above list is exemplary and that display screen may be made of any material capable of displaying video from a projector located behind display screen 110.

Figure 1B:
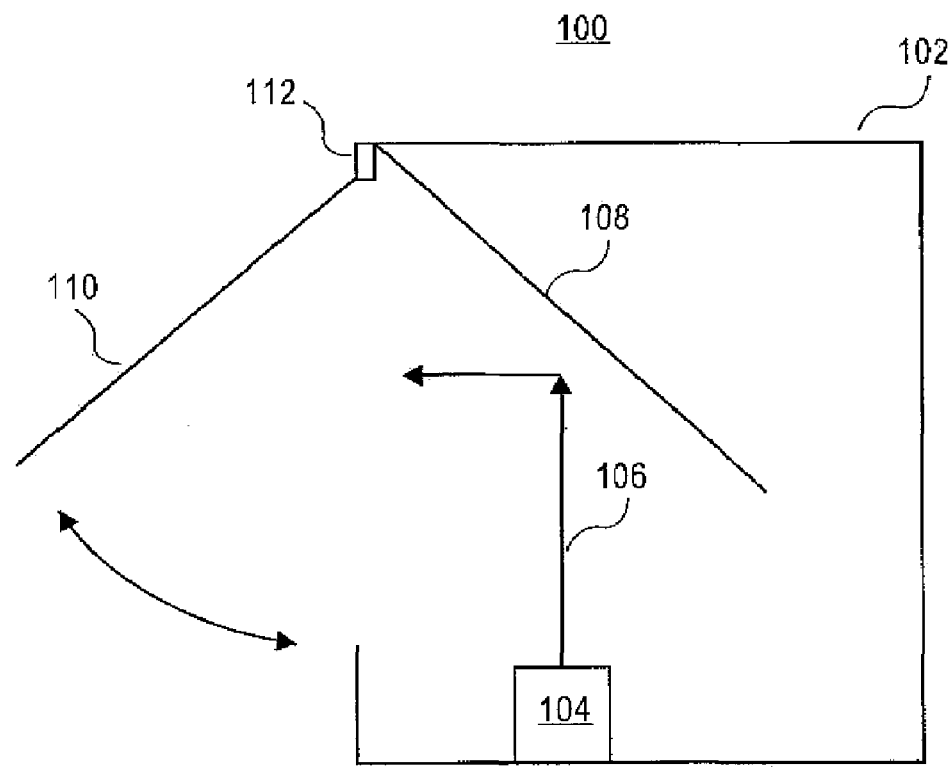

Further, as illustrated in FIG. 1a, display screen 110 is attached to housing 102 by a hinge 112. As illustrated in FIG. 1b, hinge 112 allows display screen 110 to be tilted upward away from housing 102. This allows access to video projector 104. Hinge 112 may be any type of hinge capable of allowing display screen 110 to be tilted upward. Hinge 112 also includes a locking mechanize to allow display screen 110 to be secured once tilted upward. For example, hinge 112 may include a hydraulic cylinder. One skilled in the art will realize that hinge 112 may be any type of locking mechanism to hold display screen 110 in place once tilted.

Alternatively, hinge 112 may comprise a power assist system to allow display screen to be automatically tilted. For example, hinge 112 may include a powered hydraulic cylinder or a motor and gear system which may automatically tilt display screen 110 without force applied by a user. A user may activate the power assist system by a switch (not shown) on housing 102 or by remote control (not shown).

Figure 2:
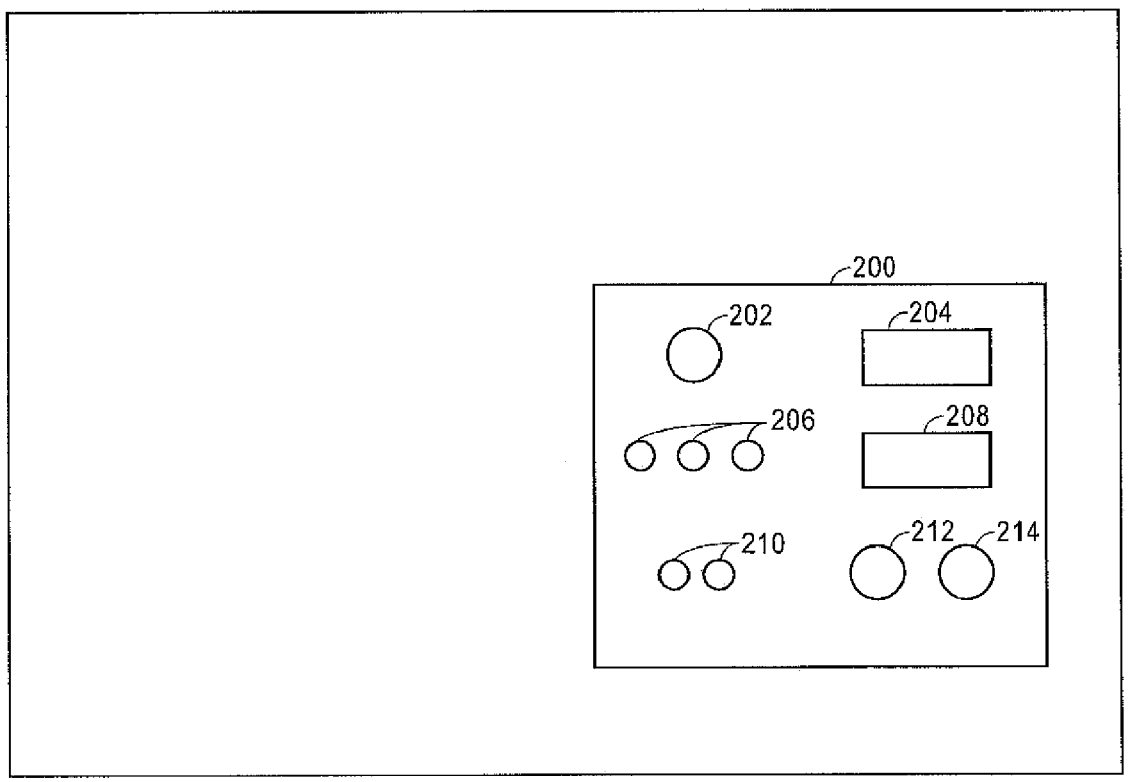
FIG. 2 is a rear view diagram illustrating a system for displaying a video consistent with aspects of the present invention.

FIG. 2 is a back view of video projector 104 illustrating input/output ports 200 for sending and receiving signals consistent with aspects of the present invention. The video source may be coupled to one of the input/output ports 200. As illustrated in FIG. 2, input/output ports 200 include a S-video input 202, DVI-I input 204, component video input 206, VGA input 208, audio input 210, coaxial video input 212, and coaxial audio input 214.

Input/output ports 200 may include additional input and output ports. For example, input/output ports 200 may include ports any number of a S-video input, S-video output, composite video input, composite video output, component video input, component video output, DVI-I video input, DVI-I video output, coaxial video input, coaxial video output, audio input, audio output, infrared input, infrared output, RS-232 input, RS-232 output, VGA input, or VGA output. One skilled in the art will realize that the preceding list of input and output ports is exemplary and that input/output ports 200 may include any port capable of sending or receiving an electrical signal. Input/output ports 200 are coupled to the internal components of video projector 104.

Figure 3A:
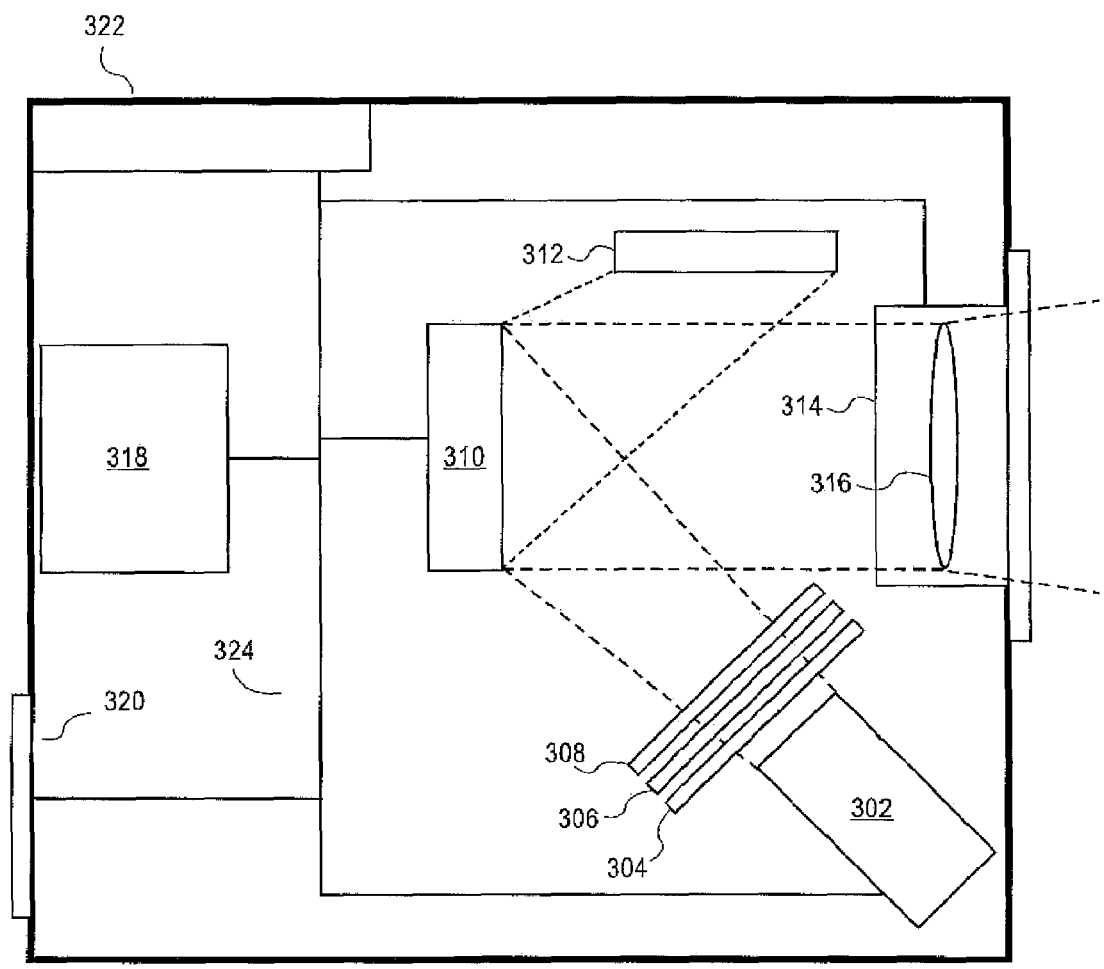
FIG. 3a is a diagram illustrating a DLP video projector consistent with aspects of the present invention.

FIG. 3a illustrates an exemplary DLP video projector 300 which may be used as video projector 104. DLP video projector 300 is an example of one type of projector which may be used with system 100. One skilled in the art will understand that any type of video projector may be used with system 100 such as a CRT projector or an LCD projector.

DLP video projector 300 may include a controller 318 and a bus 324. Controller 318 may include components to control and monitor DLP video projector 300. For example, controller 318 may include a processor, non-volatile memory, and mass storage. All the components of DLP video projector 300 may be coupled to bus 324 to allow all the components to communicate with controller 318 and one another. DLP video projector 300 includes a fan 322 to cool DLP video projector 300. Fan 322 may be coupled to bus 324. DLP video projector 300 also includes a power supply (not shown) coupled to all the components.

DLP video projector 300 contains a light source 302 for generating light to produce a video image. Light source 302 may be, for example, an ultra-high performance ("UHP") lamp capable of producing from 50-500 watts of power. Light source 300 may be coupled to bus 324 to communicate with other components. For example, controller 318 or DLP circuit board 310 may control the brightness of light source 302.

Light generated by light source 302 passes though optics 304, 308 and color filter 306. Optics 304 and 308 may be, for example, a condenser and a shaper, respectively, for manipulating the light generated by light source 302. Color filter 306 may be, for example, a color wheel capable of spinning at various speeds to produce various colors.

Video projector 300 also contains a DLP circuit board 310. DLP circuit board 310 may include a digital micro-mirror device, a processor, and memory. For example, DLP circuit board 310 may be a DARKCHIP2 or DARKCHIP3 DLP chip manufactured by TEXAS INSTRUMENTS. DLP circuit board 310 is coupled to bus 324 to receive the video signal received from input/output ports 320 and to communicate with controller 318. DLP circuit board 310 reflects light from light source 302 using the digital micro-mirrors and generates video based on the video signal to be displayed on video screen 202. DLP circuit board 310 reflects light not used for the video onto light absorber 312. Light reflected by DLP circuit board 310 used for the video passes through lens housing 314 and lens 316. Lens 316 focuses the video to be displayed on display screen 102. Lens housing 314 may include a manual lens moving mechanism or a motor to automatically move lens 316. The manual lens moving mechanism or motor allows the position of lens 316 and, as a result, shift the position of the video displayed on display screen 102. The shifting may be achieved by moving lens 316 in any combination of the x, y, or z directions.

DLP video projector 300 also includes input/output ports 320. Input/output ports 320 may be a single port or multiple ports. Input/output ports 320 enables DLP video projector to receive video signals, receive signals from a remote control device, and output signals to other sources. For example, input/output ports 320 may include ports as illustrated in FIG. 2 or any number of a S-video input, S-video output, composite video input, composite video output, component video input, component video output, DVI-I video input, DVI-I video output, coaxial video input, coaxial video output, audio input, audio output, infrared input, infrared output, RS-232 input, RS-232 output, VGA input, or VGA output. One skilled in the art will realize that the preceding list of input and output ports is exemplary and that input/output ports 320 may include any port capable of sending or receiving an electrical signal. Input/output ports 320 are coupled to bus 324. Signals input into DLP video projector 300 may be transferred to the various components of DLP video projector 300 via bus 324. Likewise, signals output of DLP video projector 300 may be transferred to input/output ports 320 via bus 324.

Figure 3B:
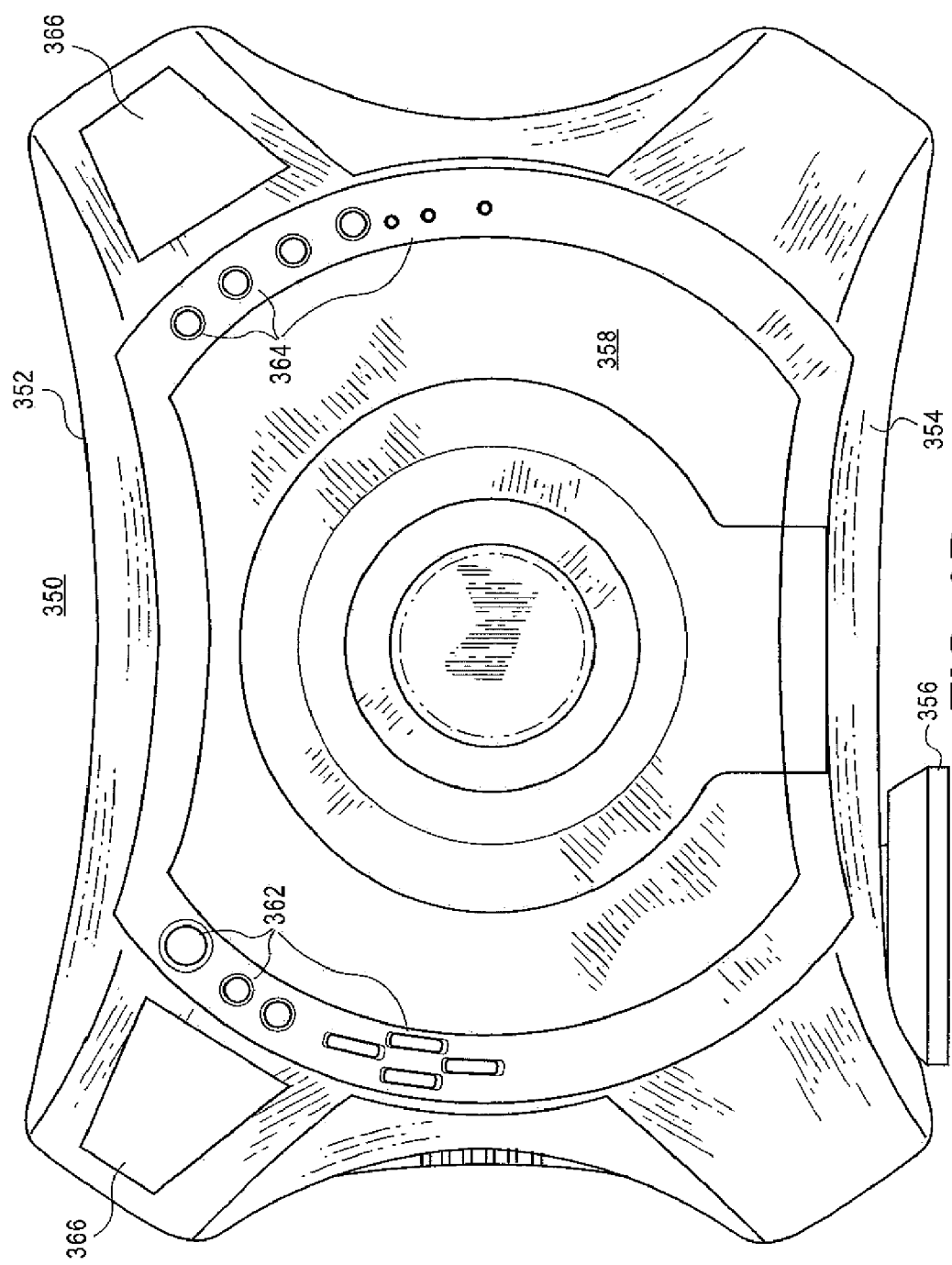
FIGS. 3b-f are various views illustrating an integrated video projector and video source consistent with aspects of the present invention.

As stated above, the video source may be integrated with video projector 104. FIGS. 3b-f are various views of a video projection system 350 which includes a video source and video projector integrated into a single housing 352 consistent with aspects of the present invention. Video projection system 350 may be utilized as system 104 in video system 100. FIG. 3b is a top view of video projection system 350 consistent with aspects of the present invention. As shown in FIG. 3b, video projection system 350 includes video projector 354 and a video source 358 in a single housing. For example, video projector 354 may be a DLP projector and video source 358 may be a DVD player. Video projection system 350 includes a lens housing 356 located in a front portion of video projector 354. Lens housing 356 may include various lens used in projecting video onto a display screen. Further, video source 358 includes a tray 360 for housing media read by video source 358. For example, if video source 358 is a DVD player, tray 360 may house DVD discs.

Further, as illustrated in FIG. 3b, video projection system 350 includes projector controls 362 for operating video projector 354. For example, projector controls 362 may be a power switch, zoom controls, input/output select controls, and picture mode controls. Video projection system 350 also includes video source controls 364. For example, video source controls 364 may be tray open/close controls, play/stop controls, and video search controls for operating video source 358. Video projection system 350 may also be controlled by a remote device (not shown). For example, a remote device may include redundant projector controls 362 and video source controls 364. Video projection system 350 also includes speakers 366 for presenting sounds corresponding to video generated by video projection system 350.

Figure 3C:
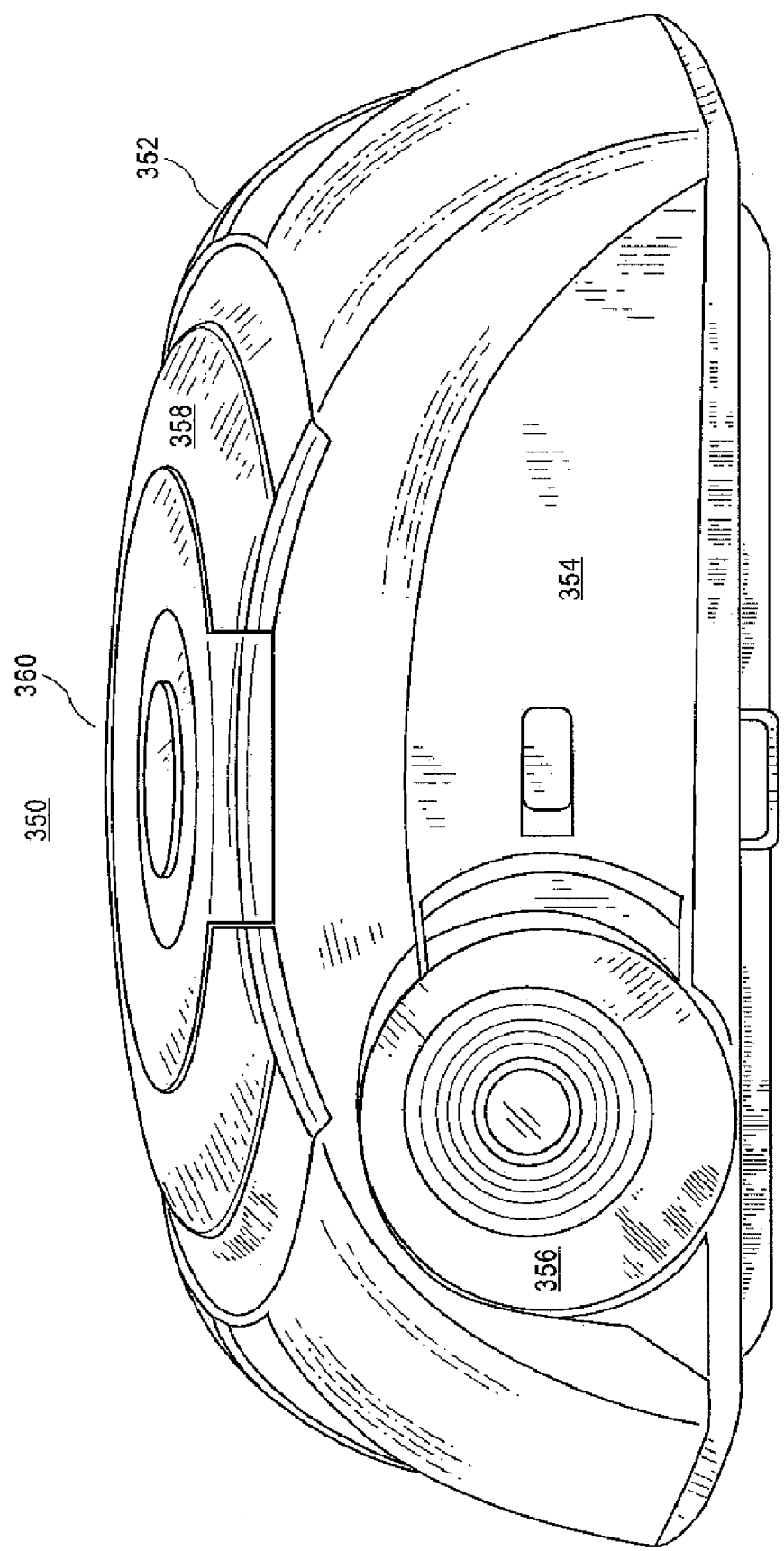
Figure 3D:
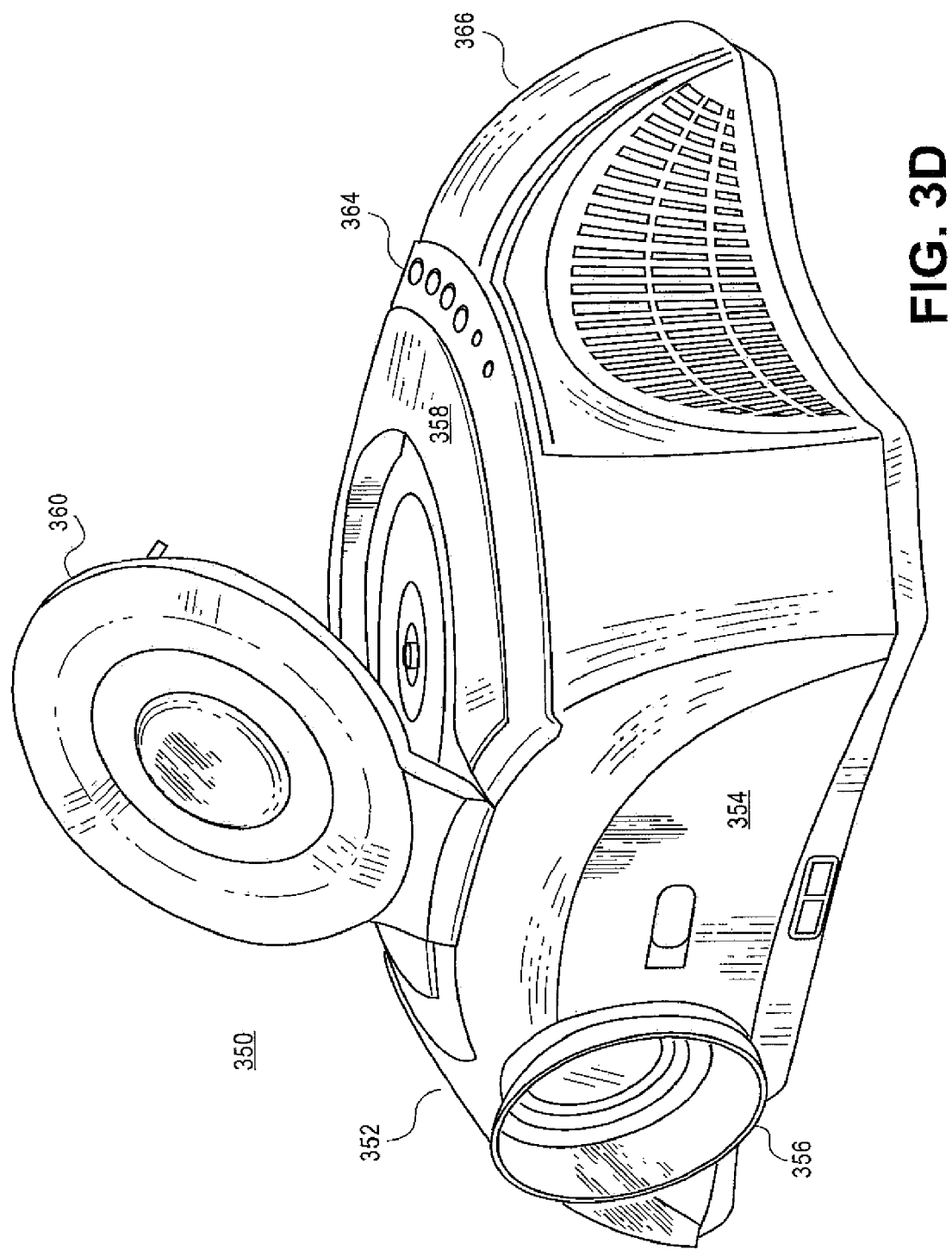

FIG. 3c is a front view of video projection system 350. As shown in FIG. 3c, lens housing 356 is located in the front portion of housing 352 of video projection system 350. Further, video source 358 and tray 360 may be housed in the top portion of housing 352 of projection system 350. FIG. 3d is another front view of video projection system 350. FIG. 3d illustrates video projection system 350 when tray 360 is open for inserting media to be played by video source 358.

Figure 3E:
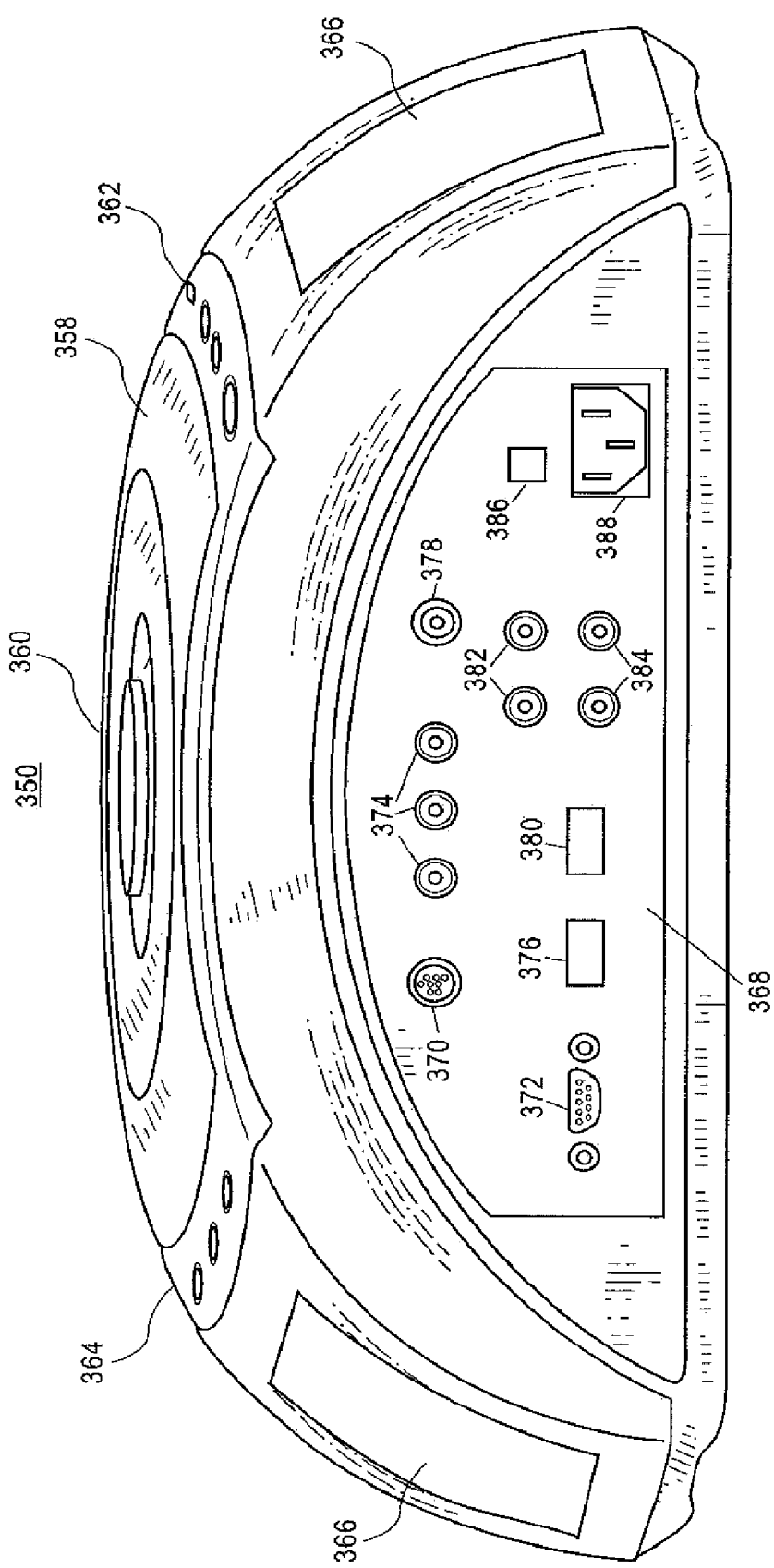

FIG. 3e is a rear view of video projection system 350. As illustrated in FIG. 3e, input/output ports 368 are located in a rear portion of housing 352 of video projection system 350. For example, input/output ports 368 may include an S-video input 370, DVI-I input 372, component video input 374, VGA input 376, composite video input 378, RS-232 port 380, audio input 382, audio output 384, and optical audio output 386, and power input 388. Input/output ports 368 may include additional input and output ports (not shown). For example, input/output ports 368 may include ports any number of a S-video input, S-video output, composite video input, composite video output, component video input, component video output, DVI-I video input, DVI-I video output, coaxial video input, coaxial video output, audio input, audio output, infrared input, infrared output, RS-232 input, RS-232 output, VGA input, or VGA output. One skilled in the art will realize that the preceding list of input and output ports is exemplary and that input/output ports 368 may include any port capable of sending or receiving an electrical signal.

Further, as illustrated in FIG. 3e, speakers 366 are located in the sides of the rear portion of housing 352 of video projection system 350. Of course, speakers 366 may also be located in other portions of housing 352. In addition, video projection system 350 may be coupled to other speakers (not shown) that are external to housing 352.

Figure 3F:
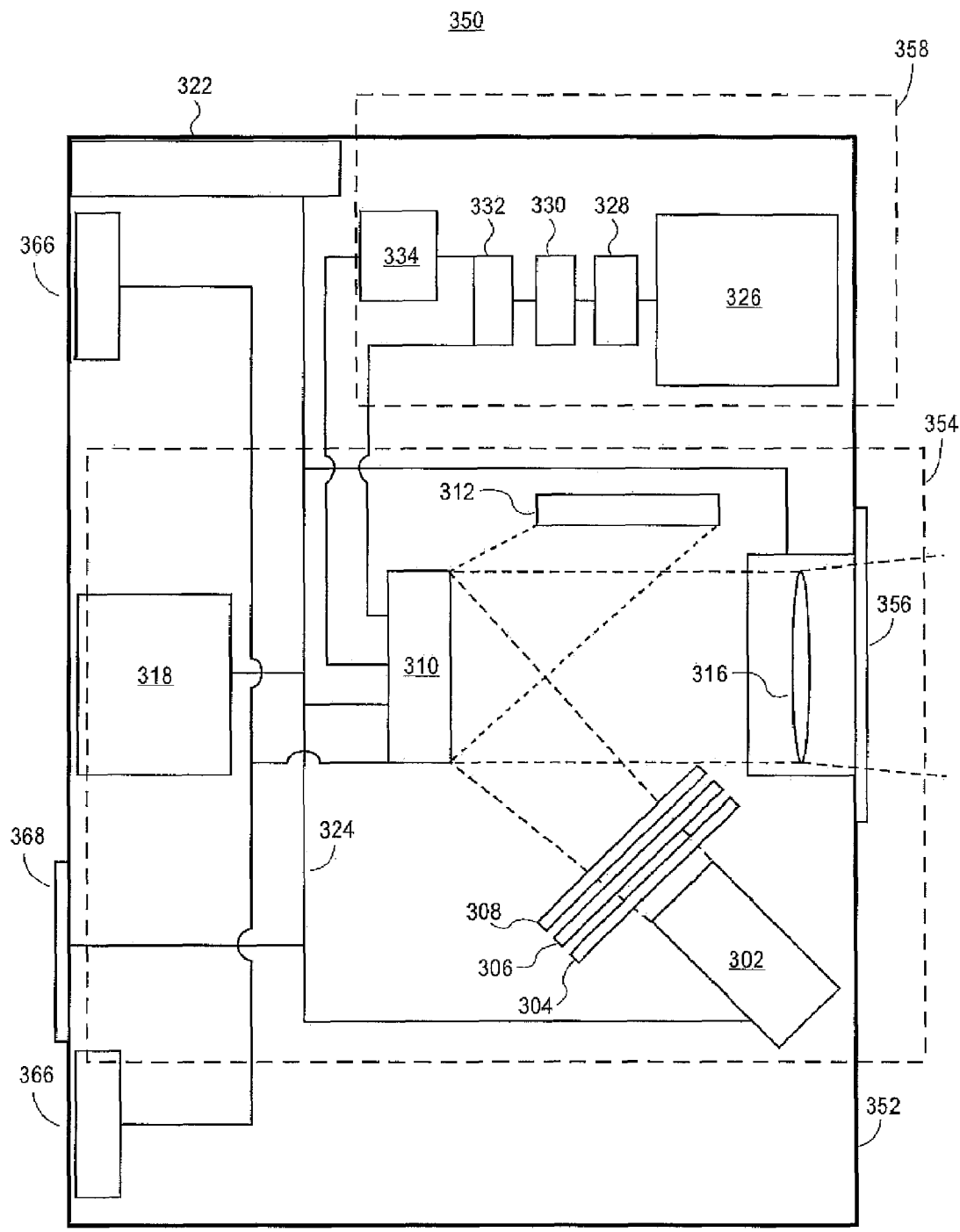
Figure 3G:
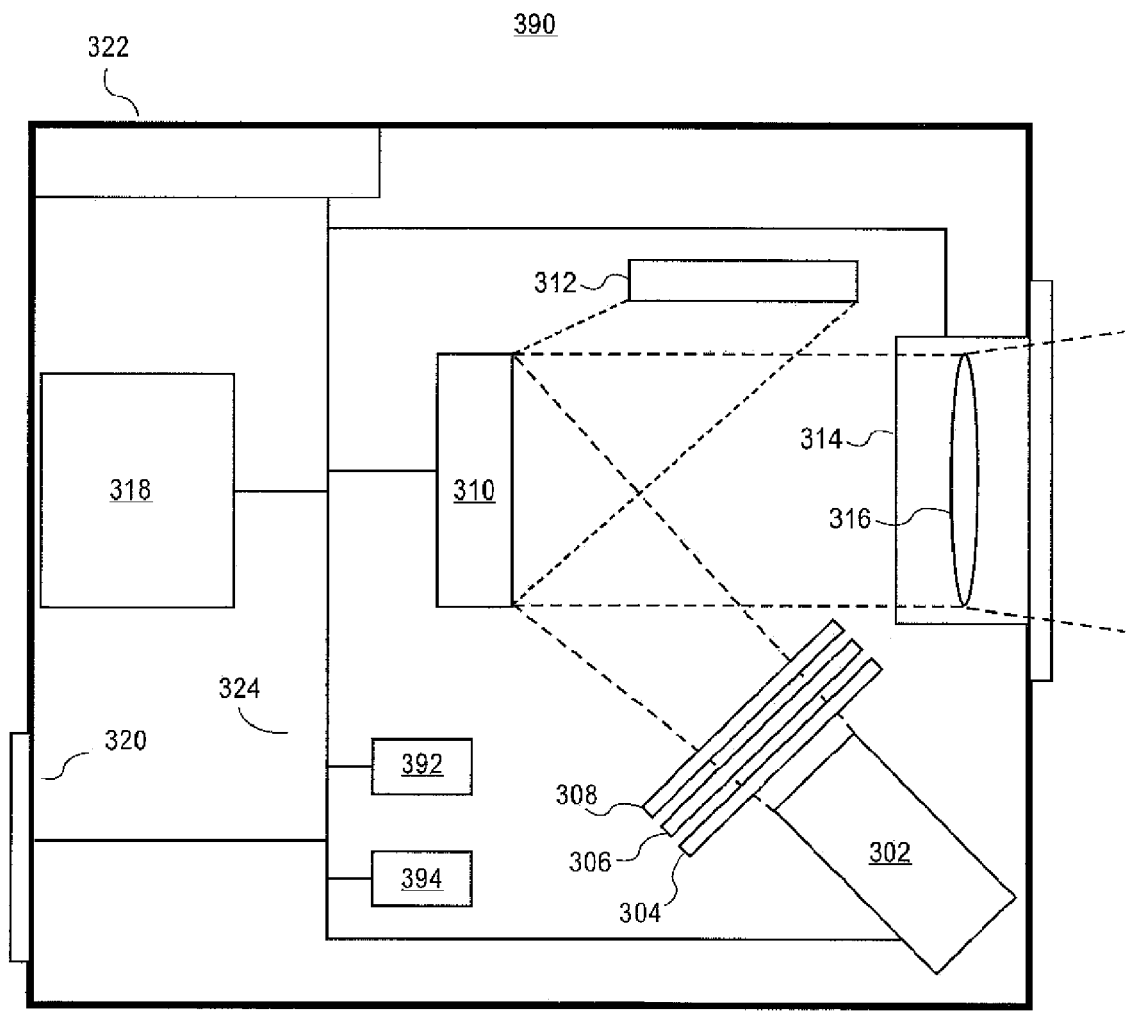
FIG. 3g is a diagram illustrating a DLP video projector consistent with aspects of the present invention.

FIG. 3f is a block diagram illustrating internal components of video projection system 350 consistent with aspects of the present invention. As illustrated in FIG. 3f, video projection system 350 includes a DLP video projector 354 and a DVD player 358 integrated into a single housing 352. DLP video projector 354 is an example of one type of projector which may be used with video projection system 350. One skilled in the art would understand that any type of video projector may be used with video projection system 350 such as a CRT projector or an LCD projector. Further, DVD player 358 is an example of one type of video source which may be used with video projection system 350. One skilled in the art will understand that any type of video source may be used with video projection system 350.

DLP video projector 354 may include a controller 318 and a bus 324. Controller 318 may include components to control and monitor DLP video projector 354. For example, controller 318 may include a processor, non-volatile memory, and mass storage. All the components of DLP video projector 354 may be coupled to bus 324 to allow all the components to communicate with controller 318 and one another. DLP video projector 354 includes a fan 322 to cool DLP video projector 354. Fan 322 may be coupled to bus 324. DLP video projector 354 also includes a power supply (not shown) coupled to all the components.

DLP video projector 354 contains a light source 302 for generating light to produce a video image. Light source 302 may be, for example, an UHP lamp capable of producing from 50-500 watts of power. Light source 300 may be coupled to bus 324 to communicate with other component. For example, controller 318 or DLP circuit board 310 may control the brightness of light source 302.

Light generated by light source 302 passes though optics 304, 308 and color filter 306. Optics 304 and 308 may be, for example, a condenser and a shaper, respectively, for manipulating the light generated by light source 302. Color filter 306 may be, for example, a color wheel capable of spinning at various speeds to produce various colors.

DLP projector 354 also contains a DLP circuit board 310. DLP circuit board 310 may include a digital micro-mirror device, a processor, and memory. For example, DLP circuit board 310 may be a DARKCHIP2 or DARKCHIP3 DLP chip manufactured by TEXAS INSTRUMENTS. DLP circuit board 310 is coupled to bus 324 to receive the video signal received from input/output ports 320 and to communicate with controller 318. DLP circuit board 310 reflects light from light source 302 using the digital micro-mirrors and generates video based on the video signal to be displayed on display screen 102. DLP circuit board 310 reflects light not used for the video onto light absorber 312. Light reflected by DLP circuit board 310 used for the video passes through lens housing 356 and lens 316. Lens 316 focuses the video to be displayed on display screen 102. Lens housing 356 may include a manual lens moving mechanism or a motor to automatically move lens 316. The manual lens moving mechanism or motor allows the position of lens 316 and, as a result, shift the position of the video displayed on display screen 102. The shifting may be achieved by moving lens 316 in any combination of the x, y, or z directions.

DLP video projector 354 also includes input/output ports 368. Input/output ports 368 may be a single port or multiple ports. Input/output ports 368 enables DLP video projector 354 to receive video signals, receive signals from a remote control device, and output signals to other sources. For example, input/output ports 368 may include ports as illustrated in FIG. 3e or any number of a S-video input, S-video output, composite video input, composite video output, component video input, component video output, DVI-I video input, DVI-I video output, coaxial video input, coaxial video output, audio input, audio output, infrared input, infrared output, RS-232 input, RS-232 output, VGA input, or VGA output. One skilled in the art will realize that the preceding list of input and output ports is exemplary and that input/output ports 368 may include any port capable of sending or receiving an electrical signal. Input/output ports 368 are coupled to bus 324 and to audio bus 336. Signals input into DLP video projector 354 may be transferred to the various components of DLP video projector 354 via bus 324. Likewise, signals output of DLP video projector 354 may be transferred to input/output ports 368 via bus 324.

DLP video projector 354 also includes DVD player 358. DVD player 358 is composed DVD reader 326. DVD reader 326 may include a spindle motor for turning a DVD disc, a pickup head, and a head amplifier equipped with an equalizer. DVD reader 326 is coupled to a decoder/error correction circuit 328, a content scrambling system 330 for copy protecting DVD contents, a program stream demultiplexer ("PS demultiplexer") 332.

DVD player reads a DVD disc with DVD reader 326 by emitting laser light from the pickup head in order to irradiate the DVD disc with a predetermined wavelength. The reflected light is converted to an electric signal which is then output to the head amplifier. The head amplifier serves to perform signal amplification, waveform shaping and digitization while decoder/error correction circuit 328 serves to perform 8-16 decoding and error correction. Next, content scrambling system 330 performs mutual authentication of the DVD disc and DVD player 358 in order to confirm the authorization.

When the authorization is successfully finished, PS demultiplexer 332 separates the program stream ("PS") as read from the DVD disc into sound and video data in the form of packetized elementary streams ("PES"). Audio stream decoder 334 decodes the PES sound stream with sound compression encoding technology in order to output audio signals. For example, audio stream decoder may utilize sound compression formats such as AAC, AC3, and MPEG. DLP circuit board 310 decodes and processes the video PES which would include video, sub-picture, and navigation data. For example, DLP circuit board 310 may utilize video compression formats such as MPEG 2. The decoded sound stream is transferred to DLP circuit board 310 and DLP circuit board 310 synchronizes sounds, which is transferred to speakers 366 via sound bus 336 and video, which is generated by DLP video projector 354.

One skilled in the art will realize that controller 318 may be utilized in combination with DLP circuit board 310 for producing video and sound from DVD player 358. Further, DLP circuit board 310 or controller 318 may perform audio decoding functions similar to the functions as performed by audio stream decoder 334.

FIG. 3f is a block diagram illustrating internal components of DLP video projector 390 consistent with aspects of the present invention. DLP video projector 390 includes all the components of DLP video projector 300. In addition, video projection system 390 includes a temperature sensor 392. Temperature sensor 392 may be any type of senor capable of measuring the temperature inside of DLP video projector 390. For example, temperature sensor 392 may be a thermocouple. DLP video projector 390 also includes an air pressure sensor 394. Air pressure sensor 394 may be any type of sensor capable of measuring the air pressure inside DLP video projector 390. For example, air pressure sensor 394 may be a piezoelectric crystal sensor. Both temperature sensor 392 and air pressure sensor 394 may be coupled to bus 324. Temperature sensor 392 and air pressure sensor 394 may be controlled by controller 318 or DLP circuit board 310. One skilled in the art will realize that DLP video projector 350 may include a temperature sensor 392 and air pressure sensor 394.

Figure 4:
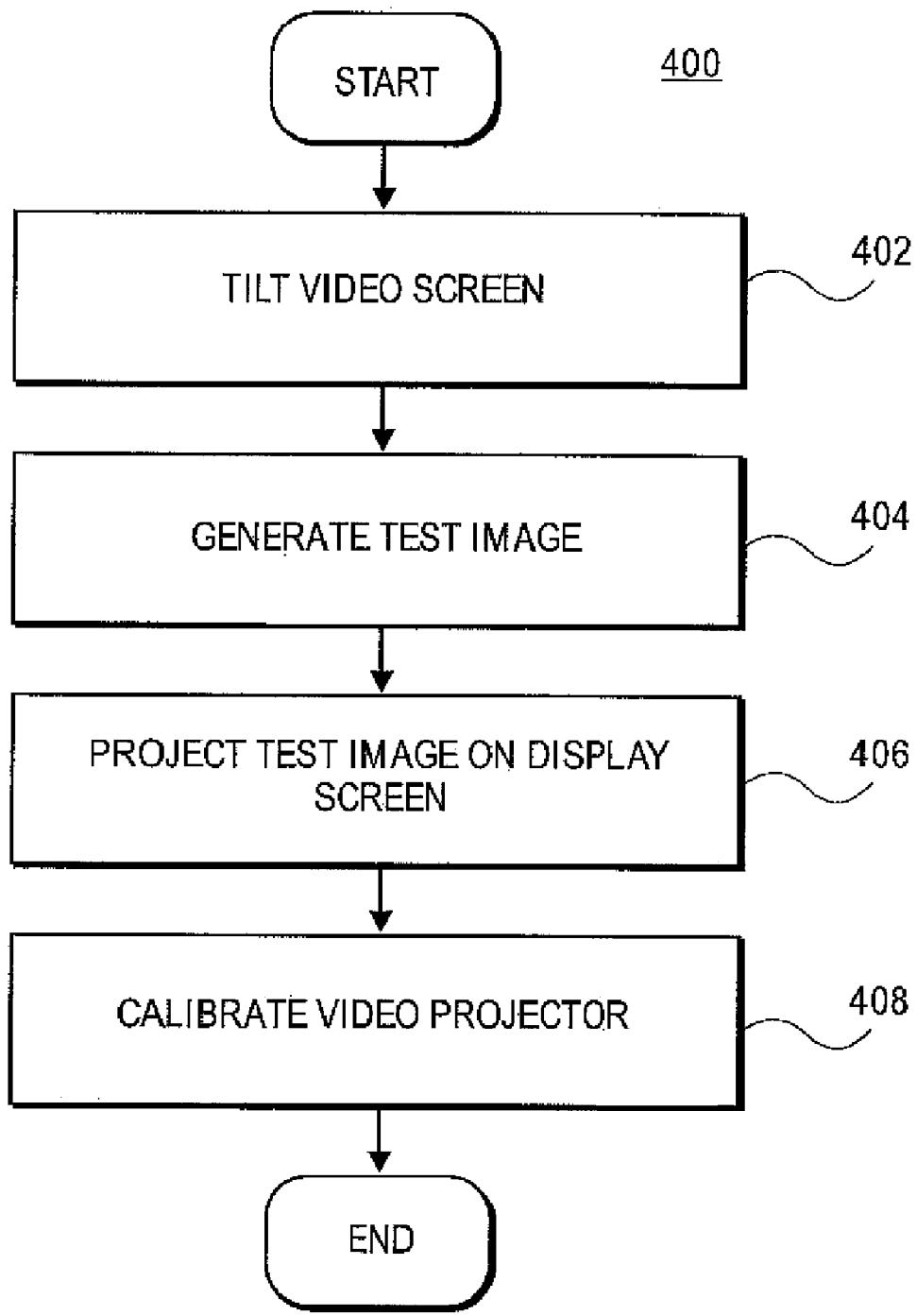
FIGS. 4 and 5 are flow charts illustrating a method of calibrating a video system consistent with aspects of the present invention.
Figure 5:
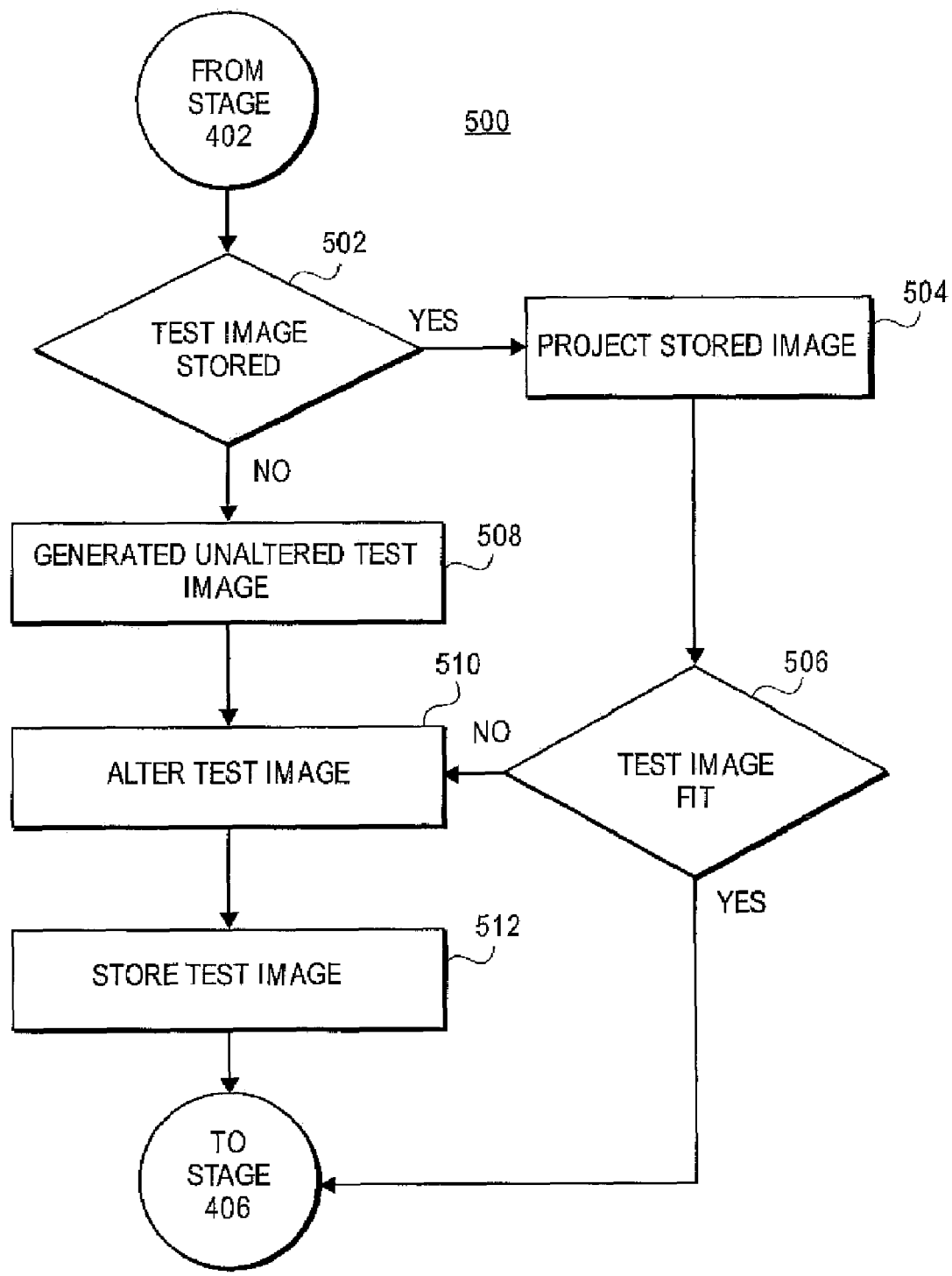

FIG. 4 illustrates a method 400 for calibrating video system 100 consistent with aspects of the present invention. In video system 100, display screen 110 may be tilted up to gain access to video projector 104. Method 400 may be performed by any control and processing hardware, software, or combination thereof contained in video projector 104. For example, if DLP projector 300 is utilized, method 400 may be performed by a user manipulating controller 318, DLP circuit board 310, software stored in controller 318, software stored in DLP circuit board 310, or any combination thereof. One skilled in the art will realize that method 400 is merely exemplary and that method 400 may be performed by any hardware, software, or combination thereof capable of performing processing and control functions of the various components of video projector 104.

Method 400 begins with display screen 110 being tilted upward (stage 402). Display screen 110 may be tilted far enough so that a user may gain access to video projector 104. Next, user may operate video projector 104 to generate a test image that is to be displayed on display screen 110 (stage 404). Since display screen 110 is titled, the test image is configured or altered so that the test image appears normally on the titled display screen. For example, if the screen is tilted upward, the image may be altered to correct trapezoidal or keystoning distortion caused by the angle between the video path and the screen.

Other parameters of the image may need to be altered to fit display screen 110. The image may be altered mechanically using such image settings as focus, pitch, yaw, and roll. The image may also be mechanically altered using projector position settings such as projector shift up, down, left, right, forward, and backward. The image may also be electronically altered using such settings as digital image shift.

Figure 6A:
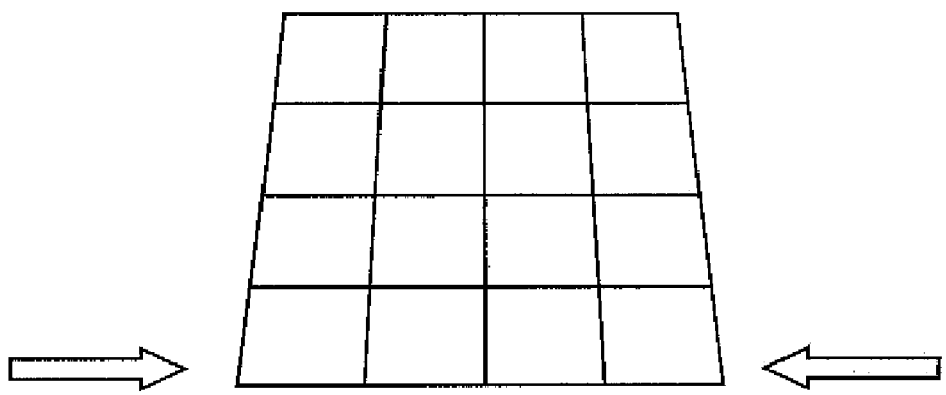
FIG. 6a-c are diagrams illustrating a test image consistent with aspects of the present invention.
Figure 6B:
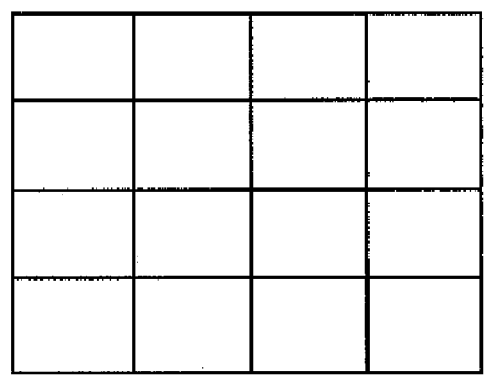
Figure 6C:

The test image may be any type of video image used in calibrating video projector 104. For example, the test image may be a constant image of color bars or a grid pattern (FIG. 6a-c). The test image may be generated by video projector 104. Further, the test image may be stored in memory located in video projector 104. Additionally, the test image may be supplied by a video source coupled to video projector 104 such as video as a video source mentioned above.

After generation, the test image is projected onto tilted display screen 110 (stage 406). Finally, video projector 104 is calibrated using the test image. Video projector 104 may be calibrated in any number of ways. For example, the user may manipulate settings of video projector 104 to alter the focus, color, contrast, brightness etc.

FIGS. 5 and 6a-c illustrate a method 500 for generating a test image in stage 404 to be displayed on tilted display screen 110. Since display screen 110 is tilted with respect the video beginning projected from video projector 104, the test image is configured to fit on the tilted display screen 110. Specifically, since display screen 110 is tilted upward, the test image is configured to compensate for trapezoidal or keystoning distortion caused by the tile of display screen 110. Additionally, the image may as be altered mechanically or electronically to fit the display screen.

Method 500 may be performed by any control and processing hardware, software, or combination thereof contained in video projector 104. For example, if DLP projector 300 is utilized, method 500 may be performed by controller 318, by DLP circuit board 310, by software stored in controller 318, by software stored in DLP circuit board 310, or any combination thereof. One skilled in the art will realize that method 500 being performed by the components of DLP projector 300 is exemplary and that method 500 may be performed by any hardware, software, or combination thereof capable of performing processing and control functions of the various components of video projector 104.

Method 500 begins by determining if the test image is stored in memory (stage 502). If the test image is stored in memory, the test image is projected on display screen 110 (stage 504). Then, the test image may need to be further altered (stage 506). The test image may need to be further altered if display screen 110 or video projector 104 has moved since the last time the test image was used. Otherwise, the test image may be projected onto the display screen and the projector calibrated (stages 404 and 406).

If the test image is not stored, a default (or unaltered) test image may be provided or retrieved and then projected onto tilted display screen 110 (stage 508). The test image may be generated by video projector 104. Additionally, the test image may be supplied by a video source coupled to video projector 104 such as video as a video source mentioned above. The test image may be the size and shape that would be normally display on an un-tilted display screen 110. Thus, this default test image would not properly fit tilted display screen 110. FIG. 6a illustrates the display of the unaltered test image on display screen 110. Since display screen is tilted upward, the image would appear larger near the bottom of the test image.

Next, the test image is altered to fit tilted display screen 110 (stage 510). Since display screen 110 is titled upward, the bottom portion of test image must be shrunk inward so that it fits display screen 110. FIG. 6a illustrates the alteration to the test image to correct the trapezoidal distortion. FIG. 6b illustrates the view of the altered test image on tilted display screen 110. FIG. 6c illustrates the view of the altered test image on display screen 110 in a un-tilted configuration.

The pre-projected image may be modified line by line to correct for the trapezoidal distortion or the lens inside video projector may be moved to alter the test image. To size the test image to fit the screen, the angle of the screen tilt may be input into video projector 104 to determine the alteration of the test image. Likewise, the default image may be displayed on tilted display screen 110 and then modified using controls on video projector 104 until the test image properly fits tilted display screen 110.

Additionally, other parameters of the image may need to be altered to fit display screen 110. The image may be altered mechanically using such image settings as focus, pitch, yaw, and roll. The image may also be mechanically altered using projector position settings such as projector shift up, down, left, right, forward, and backward. The image may also be electronically altered using such settings as digital image shift.

Optionally, after the test image is altered, the altered test image may be stored in memory (stage 512). Afterwards, video projector may be calibrated using the test image (stage 406 and 408).

Other aspects of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for calibrating a video display system, comprising:
   receiving an indication that a display screen of the video display system has been tilted to expose a video projector;
   generating a test image to display on the tilted display screen in order to calibrate the video projector, wherein the test image is altered to fit the tilted display screen;
   projecting the test image onto the tilted display screen; and
   calibrating the video projector using the test image.

2. The method of claim 1, wherein the test image is altered by correcting trapezoidal distortion of the image displayed on the tilted display screen.

3. The method of claim 1 wherein generating the test image comprises:
   retrieving the test image from memory which has been altered to fit the tilted display screen.

4. The method of claim 1, wherein generating the test image comprises:
   determining an amount to alter the test image based on an angle of tilt of the display screen; and
   altering the test image based on the determined amount.

5. The method of claim 4, further comprising:
   storing the altered test image in memory.

6. The method of claim 4, wherein the test image is altered to compensate for a trapezoidal distortion of the test image.

7. The method of claim 4, wherein determining the amount to alter the test image comprises:
   projecting an unaltered test image on the tilted display screen; and
   modifying the unaltered test image until the unaltered test image fits the tilted display screen.

8. The method of claim 7, wherein modifying the test image comprises modifying at least one dimension of the unaltered test image.

9. The method of claim 7, wherein modifying the test image comprises:
   receiving input from a user when the unaltered test image fits the tilted display screen.

10. A video system, comprising:
    a video projector located in a housing;
    a display screen disposed adjacent to the housing, wherein the display screen is capable of being tilted to expose the video projector;
    logic for generating a test image in response to the display screen being tilted, wherein the test image is altered to fit the tilted display screen;
    logic for projecting the test image onto the tilted display screen in order to calibrate the video projector; and logic for calibrating the video projector using the test image.

11. The video display system of claim 10, further comprising:
   logic for determining an amount to alter the test image based on an angle of tilt of the display screen; and
   logic for altering the test image based on the determined amount.

12. The video system of claim 11, wherein the logic for determining an amount to alter the test image, comprises:
   logic for projecting an unaltered test image on the tilted display screen; and
   logic for modifying the unaltered test image until the unaltered test image fits the tilted display screen.

13. The video system of claim 12, further comprising an input for receiving input from a user when the unaltered test image fits the tilted display screen.

14. The video system of claim 11, further comprising a memory for storing the altered test image.

15. The video system of claim 10, further comprising:
   a memory for storing the test image.

16. The video system of claim 10, further comprising:
   a video source housed within the video projector.

17. A video system, comprising:
   means for projecting video onto a display screen, wherein the display screen is capable of being tilted to expose the video projecting means;
   means for generating a test image in response to the display screen being tilted in order to calibrate the video projector, wherein the test image is altered to fit the tilted display screen; and
   means for calibrating the video projector using the test image.

18. The video display system of claim 17, further comprising:
   means for determining an amount to alter the test image based on an angle of tilt of the display screen; and
   means for altering the test image based on the determined amount.

19. The video system of claim 18, wherein the means for determining an amount to alter the test image, comprises:
   means for projecting an unaltered test image on the tilted display screen; and
   means for modifying the unaltered test image until the unaltered test image fits the tilted display screen.

20. The video system of claim 17, further comprising:
   means for storing the test image.

* * * * *